United States Patent [19]

Kaschke

[11] Patent Number: 6,154,540
[45] Date of Patent: *Nov. 28, 2000

[54] RADIO COMMUNICATION DEVICE WITH EXPANDED KEYPAD CAPABILITY

[75] Inventor: Kevin D. Kaschke, Hoffman Estates, Ill.

[73] Assignee: Motorola, Inc., Schaumburg, Ill.

[*] Notice: This patent is subject to a terminal disclaimer.

[21] Appl. No.: 09/301,243

[22] Filed: Apr. 28, 1999

Related U.S. Application Data

[62] Division of application No. 07/984,636, Dec. 2, 1992, Pat. No. 5,907,615.

[51] Int. Cl.⁷ .................................................. H04M 1/00
[52] U.S. Cl. ................................................................ 379/433
[58] Field of Search .................................. 379/428, 433, 379/434; 455/90, 575, 127, 351; D14/138, 147, 148

[56] References Cited

U.S. PATENT DOCUMENTS

| | | |
|---|---|---|
| D. 297,734 | 9/1988 | Soren et al. . |
| D. 297,735 | 9/1988 | Soren et al. . |
| D. 298,244 | 10/1988 | Watanabe . |
| D. 300,742 | 4/1989 | Soren et al. . |
| D. 300,827 | 4/1989 | Soren et al. . |
| D. 304,189 | 10/1989 | Nagele et al. . |
| D. 305,427 | 1/1990 | Soren et al. . |
| D. 326,091 | 5/1992 | Kikuchi . |
| D. 326,451 | 5/1992 | Roegner . |
| D. 326,452 | 5/1992 | Roegner . |
| 4,517,660 | 5/1985 | Fushimoto et al. . |
| 4,855,746 | 8/1989 | Stacy . |
| 5,109,539 | 4/1992 | Inubushi et al. ..................... 379/433 |
| 5,436,625 | 7/1995 | Kubo . |
| 5,436,954 | 7/1995 | Nishiyama et al. . |
| 5,564,078 | 10/1996 | Nagai . |
| 5,584,054 | 12/1996 | Tyneski et al. . |
| 5,710,576 | 1/1998 | Nishiyama et al. . |
| 5,715,524 | 2/1998 | Jambhekar et al. . |
| 5,907,615 | 5/1999 | Kaschke ................................ 379/433 |

FOREIGN PATENT DOCUMENTS

| | | |
|---|---|---|
| 0 678 987 A1 | 10/1995 | European Pat. Off. . |
| 4-04023547 | 1/1992 | Japan .................................. 379/433 |

*Primary Examiner*—Jack Chiang
*Attorney, Agent, or Firm*—Kevin D. Kaschke; Sylvia Chen

[57] ABSTRACT

A wireless communication device (10) is provided for maintaining acceptable acoustic coupling, increasing display and data input device capability and increasing antenna performance to encourage further miniaturization and weight reduction thereof. Two moveable housing portions (12) and (14) are moveable between a closed (18) and an open (20) housing position and matively engage to provide an expandable housing while aligning earpiece (26) and microphone (28) transducers on a center axis (30) of the device (10). Paging and radiotelephone functions of the device are configured responsive to the position of the housing portion (12). The housing portion has a lens for viewing a display (46) thereunder and keycaps for actuating a keypad (54) thereunder when the housing portion (12) is in the closed housing position (18). An antenna (56) is extendable beyond the moveable housing portion (12).

14 Claims, 4 Drawing Sheets

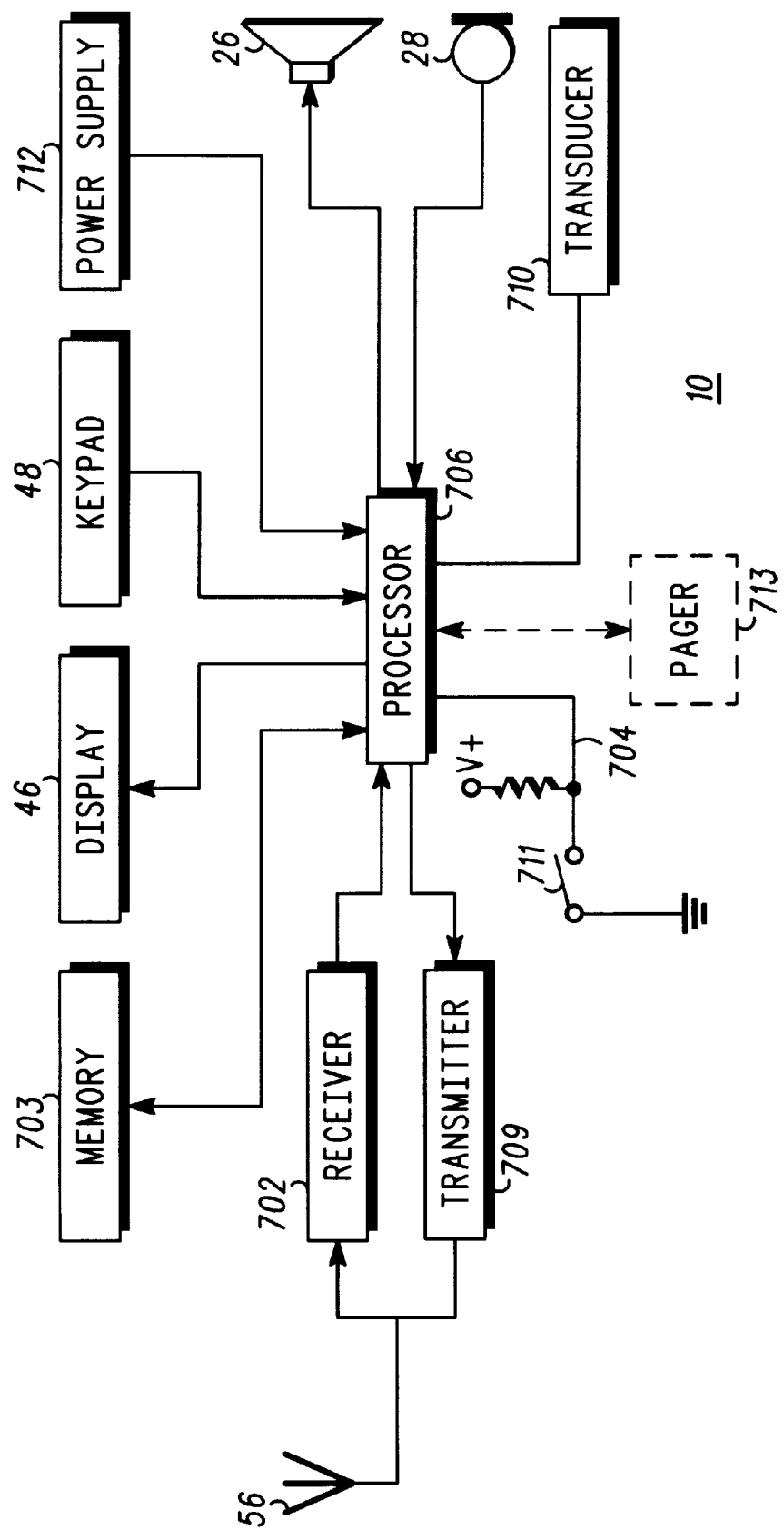

RADIO COMMUNICATION DEVICE WITH EXPANDED KEYPAD CAPABILITY

CROSS REFERENCE TO RELATED APPLICATION

The present application is a Divisional of U.S. application Ser. No. 07/984,636, filed on Dec. 2, 1992, which is hereby incorporated by reference, and priority thereto for common subject matter is hereby claimed.

FIELD OF THE INVENTION

The present invention relates generally to radio communication devices having an expanded keypad capability.

BACKGROUND OF THE INVENTION

Advances in computing, wireless transceivers, displays, data input devices, batteries, materials and mechanics have promoted the miniaturization and weight reduction of wireless communication devices such as portable radiotelephones. However, there are tradeoffs associated with the advantages of such miniaturization.

Firstly, smaller devices result in a shorter distance between the earpiece and microphone transducers. Since the typical distance between a human ear and mouth remains unchanged, acceptable acoustic coupling between the earpiece transducer and the human ear, and between the microphone transducer and the human mouth is becoming more difficult to maintain. Various solutions have addressed this problem by slidably or rotatably coupling one or more moveable housing elements to the main body portion of the radiotelephone. The housing elements have earpiece or microphone transducers disposed therein. The distance between the earpiece and microphone transducers is increased by moving the housing element to an open position during use and decreased by moving the housing element to a closed position when not in use. Thus, reliable acoustic coupling is achieved when the radiotelephone is in use without compromising miniaturization when the radiotelephone is not in use. Examples of these solutions are shown in U.S. Pat. Nos.: D297,735, D297,734, D326,091, D326,451, D326,452, D298,244, D305,427, D300,827, D300,742, D304,189 and D297,736. However, as the devices become even smaller, the distance between the earpiece and microphone becomes even shorter and the acceptable acoustic coupling is even more difficult to maintain.

Secondly, smaller devices have less space for display and data input devices, such as keypads. The smaller devices have compromised these functions by making display characters and input keys smaller and thus harder to use. Additionally, the market for advanced communication devices is requiring more capability from the display and data input devices which is contradictory to the trend of providing less capability for the sake of miniaturization.

Thirdly, smaller devices have less space for an antenna thereby degrading transmission and/or reception performance. Smaller devices, having smaller antennas, are more susceptible to the well known shadowing phenomenon produced by the position of the human head between the communication device and the nearest base site when the device is held against the head during use.

Thus, there is a need to maintain acceptable acoustic coupling, increase display and data input device capability and increase antenna performance as wireless communication devices are made smaller.

BRIEF DESCRIPTION OF THE DRAWINGS

FIG. 7 is a block diagram of the radiotelephone of FIGS. 1–6 and including an optional pager.

DETAILED DESCRIPTION OF THE PREFERRED EMBODIMENTS

Figure 2:
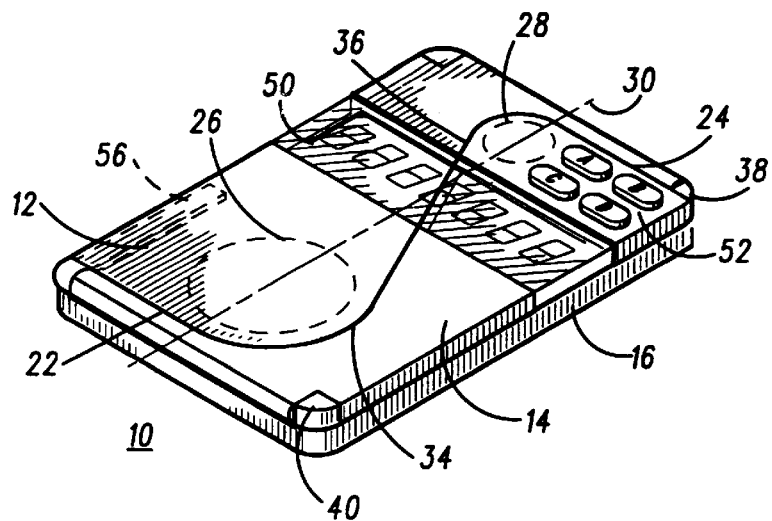
FIG. 2 is a perspective view of the radiotelephone of FIG. 1 in a closed position.
Figure 1:
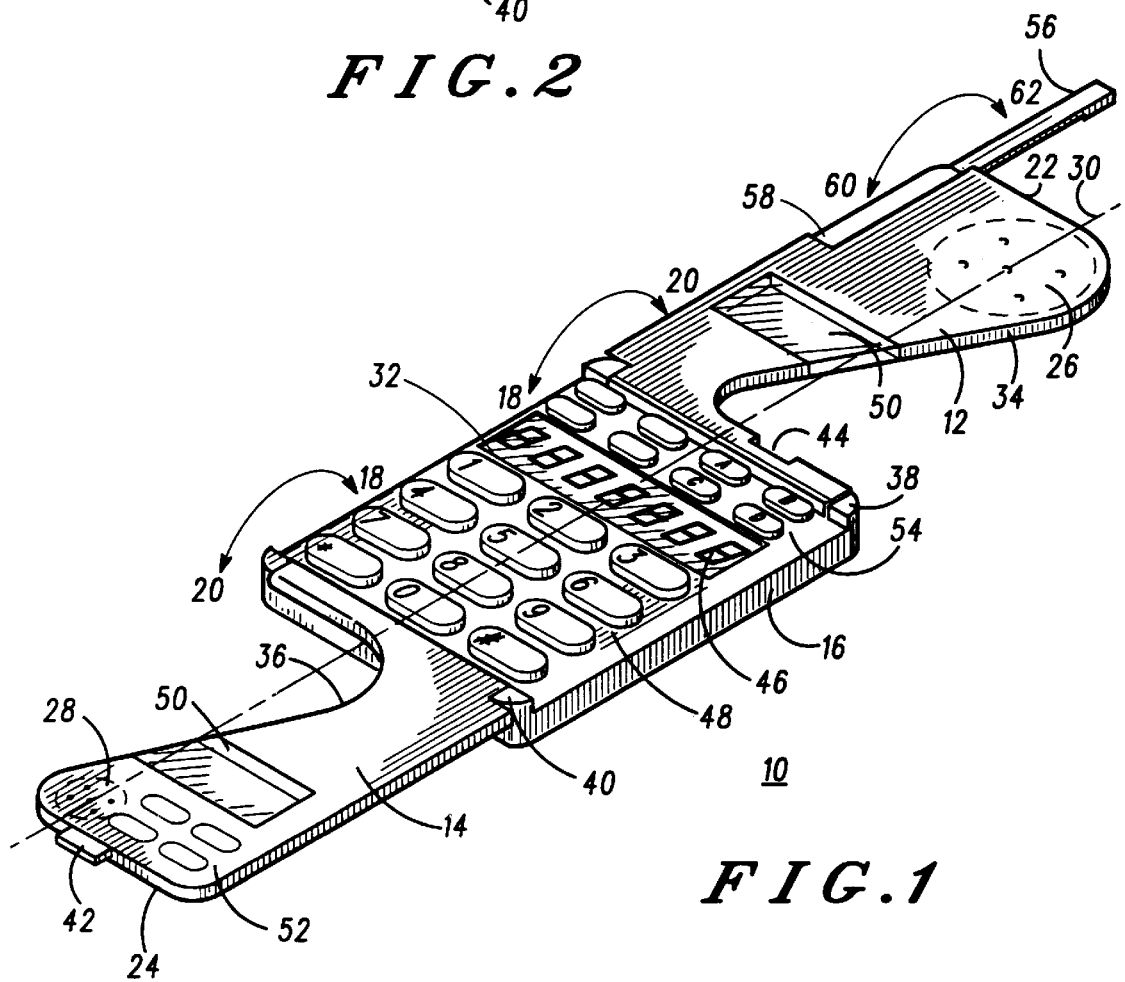
FIG. 1 is a perspective view of a radiotelephone in an open position constructed in accordance with a first preferred embodiment of the present invention.

Referring now to FIGS. 1 and 2, there are shown perspective views of a radiotelephone 10 in an open and closed position, respectively, constructed in accordance with a first preferred embodiment of the present invention. Radiotelephones that may advantageously utilize the present invention include, among others, cellular radiotelephones and cordless radiotelephones, such as cordless radiotelephone one (CT-1) and cordless radiotelephone two (CT-2). The radiotelephone 10 is similar to that of a portable cellular radiotelephone model no. F09HYD8363BG, manufactured and available from Motorola Inc., 600 North U.S. Highway 45, Libertyville, Ill. 60048. Wireless communication devices, such as the radiotelephone 10, are well known in the art and will not be described in detail except to distinguish what is well known and what is described in the preferred embodiments of the present invention.

The radiotelephone 10 comprises a housing assembly having first 12, second 14 and third 16 housing portions. The first 12 and second 14 housing portions are each coupled to the third 16 housing portion. The third housing portion includes a side 32. The first 12 and second 14 housing portions are each moveable between a first, closed position, designated by reference numeral 18 in FIG. 1 and shown in FIG. 2, and a second, open position, designated by reference numeral 20 in FIG. 1 and shown in FIG. 1. The first housing portion 12 is moveable between a first housing position 18 at least partially covering the side 32 of the third housing portion 16 and a second housing position 20 at least partially exposing the side 32 of the third housing portion 16. The second housing portion 14 is moveable between a first housing position 18 at least partially covering the side 32 of the third housing portion 16 and a second housing position 20 at least partially exposing the side 32 of the third housing portion 16.

A unique feature of the radiotelephone 10 is readily apparent from viewing both FIGS. 1 and 2. The first housing portion 12 has an end portion 22. The second housing portion 14 has an end portion 24 extending beyond the end portion 22 of the first housing portion 12 when the first 12 and the second 14 housing portions are moved to their first respective housing position 18 at least partially covering the side 32 of the third housing portion 16. Preferably, the length of the first 12 housing portion and the length of the second 14 housing portion are each greater than one-half the length of the third housing portion 16.

A conventional earpiece transducer 26 is coupled to the first housing portion 12 and a conventional microphone transducer 28 is coupled to the second housing portion 14. The earpiece 26 and microphone 28 transducers are substantially aligned with a center axis 30 of the third housing portion 16. Conventional transceiving means (see FIG. 7), coupled to the earpiece 26 and microphone 28 transducers, is preferably disposed in the third housing portion 16.

In the closed housing position 18, the first 12 and second 14 housing portions are substantially disposed in the same plane and preferably adjacent to the side 32 of the third housing portion 16. Preferably, a side 34 of the first housing portion 12 is shaped to matively engage with a side 36 of the second housing portion 14. Such engagement permits the positioning of the first 12 and second 14 housing portions in the same plane adjacent to the side 32 of the third housing portion 16 while permitting the earpiece 26 and microphone 28 transducers to align with the center axis 30.

Note that in the closed position 18, the holes in the earpiece 26 and microphone 28 transducers are facing towards the side 32 of the third housing portion 16. This produces a very clean appearance on the outside of the radiotelephone 10 when in its closed position 18.

In the open housing position 20, the first housing portion 12 is disposed at an obtuse angle relative to the third housing portion 16, preferably 180°, permitting alignment of the earpiece transducer 26 with a human ear. Similarly, the second housing portion 14 is also disposed at an obtuse angle relative to the third housing portion 16, although preferably 135°, permitting alignment of the microphone transducer 28 with a human mouth. Both the earpiece 26 and microphone 28 transducers remain aligned with the center axis 30 when the first 12 and second 14 housing portions are in the open housing position 20.

Although it would be less desirable than the preferred embodiment, one of the first 12 and second 14 housing portions may overlap the other such that the first 12 and second 14 housing portions are disposed in different but preferably substantially parallel planes.

In the preferred embodiment of the present invention, the first 12 and second 14 housing portions are rotatably coupled to the third housing portion 16 between the closed 18 and open 20 housing positions via hinge mechanisms 38 and 40, respectively. The first 12 and second 14 housing portions are manually rotated between the open 18 and closed 20 positions, one at a time. The hinge mechanisms also retain each of the first 12 and second 14 housing portions in both the closed 18 and open 20 housing positions. A variety of conventional hinge mechanisms are acceptable for use with the present invention.

The movement of the first housing portion 12 between the closed 18 and open 20 housing positions can be coupled to the movement of the second housing portion 14 between the closed 18 and open 20 housing positions. Due to the sculptured shape of the first 12 and second 14 housing portions, one of the housing portions must rotate a predetermined number of degrees relative to the third housing portion 16 before the other housing portion can rotate so that the first and second housing portions do not interfere with each other. The first housing portion 12 is retained in the closed position 18 using the hinge mechanism 38.

The second housing portion 14 includes a conventional spring member as shown in U.S. Pat. No. 4,471,493 coupled to the hinge mechanism 40. The spring member generates a biasing force to urge the second housing portion 14 to its open position 20. A tab 42 coupled to the end portion 24 of the second housing portion 14 is adapted to fit within a recess 44 in the area of the hinged mechanism 38 of the first housing portion 12 to maintain the second housing portion 14 in its closed position 18 when the first housing portion 12 is in its closed position 18. When the first housing portion 12 is manually moved to the open position 20, the tab 42 clears the recess 44 permitting the biasing force exerted by the spring member to urge the second housing portion 14 to its open position 20. The radiotelephone 10 may be thereafter closed by closing the first housing portion 12 after the second housing portion 14. Of course, more elaborate coupling mechanisms may be employed to automatically open each of the first 12 and the second 14 housing portions.

The radiotelephone 10 is advantageous in that is contracted to approximately one third of its useable length when in its closed position 18 while providing only one additional layer of housing material. This results in a reduction in thickness of the device and a weight reduction approximately equal to that of one moveable housing portion. Furthermore, when the radiotelephone 10 is expanded to its open position 20, the earpiece 26 and microphone 28 transducers remain on the center axis 30 of the third housing portion 10 permitting convenient and comfortable alignment with a human ear and mouth.

The radiotelephone 10 further includes a display 46 and a data input device, such as a keypad 48, preferably coupled to the side 32 of the third housing portion 16. As the radiotelephone 10 becomes smaller, less space is available for the display 46 and keypad 48. However, radiotelephones are being designed with more capability to provide a greater range of services and thus need additional display 46 and keypad 48 resources to support the expanded capability. One such example of added capability is the addition of a selective call receiver functions, such as a conventional pager, to the functionality of the radiotelephone 10. A conventional pager may be of the type model number A04JRC5661A, manufactured and available from Motorola Inc. 1500 N.W. 22nd Avenue, Boynton Beach, Fla. 33426-8292. The combination of a pager and a radiotelephone is already well known in the art.

Such expanded capability problems are overcome by relating paging and radiotelephone modes associated with the wireless communication device 10 to at least one of the first 12 and second 14 housing portions being moved between the closed 18 and open 20 positions. The movement of one housing portion actuates a switch (see FIG. 7) to prompt the device to change a portion of the communication device between paging and radiotelephone functions. A switch actuated responsive to the movement of a housing portion is well known as taught, by example, in U.S. Pat. No. 5,117,073.

For example, display functionality is expanded by displaying paging information when the first housing portion 12 is moved to the closed position 18 and radiotelephone information when the first housing portion 12 is moved to the open housing position 20.

For example, keypad functionality is expanded by having paging functions associated therewith when the first housing portion 12 is in the closed position 18 and radiotelephone functions associated therewith when the first housing portion 12 is moved to the open housing position 20.

The dual modes of the device are not limited to only radiotelephone and paging functions. This feature of the present invention is intended to include any two modes of the wireless communication device. For example, the dual modes alternatively include: radiotelephone vs. notebook functions, private vs. hands-free conversation and cellular vs. cordless functions.

The display 46 and keypad 48 are preferably covered by the moveable housing portions as shown in FIGS. 1 and 2, but do not necessarily need to be covered to gain the expanded functionality provided by the moveable housing portion. An example of a radiotelephone that has a moveable housing portion and does not fully cover the keypad is cordless radiotelephone model number 34986, manufactured and available from Motorola Inc., 600 North U.S. Highway 45, Libertyville, Ill. 60048.

Another unique feature of the wireless communication device 10 as shown in FIGS. 1 and 2 is a substantially transparent portion 50, hereinafter called a lens, coupled to the first 12 and second 14 housing portions. Since the display 46 is at least partially covered by the first housing portion 12 when the first housing portion 12 is moved to the closed housing position 18, the display traditionally becomes of little use. However, the lens 50 is coupled to the first 12 and second 14 housing portions such that the lens is disposed essentially opposite at least a portion of the display 46 when the first 12 and second 14 housing portions are moved to the closed housing position 18. Thus, the display capability is expanded since it can now be used when the housing portions are in their closed position 18. Of course, the lens may optionally be coupled to only one of the moveable housing portions if so desired. In accordance with the previously taught expanded keypad feature, the covered display 46 provides paging information when the housing portions are moved to their respective closed housing position 18 and radiotelephone information when the housing portions are moved to their respective open 20 housing position.

Still another unique feature of the wireless communication device 10 as shown in FIGS. 1 and 2 is keycap means 52 coupled to the second housing portion 14. Since the keypad 48 is at least partially covered by the second housing portion 14 when the second housing portion 14 is moved to the closed housing position 18, the keypad 48 traditionally becomes of little use. However, the keycaps 52 are coupled to the second housing portion 14 such that the keycaps 52 are disposed essentially opposite at least a portion of the keypad 54 when the second housing portion 14 is moved to the closed housing position 18. The keycaps 52 are comprised of conventional elastomeric material and protrude through the thickness of the second housing portion 14. The keycaps 52 are coupled to the second housing portion 14 by sandwiching webbing interconnecting individual keycaps between layers of the second housing portion 14. Thus, the keypad capability is expanded since it can now be used when the second housing portion 14 is in its closed position 18. Of course, additional keycaps may also be coupled to the first housing portion 12 if so desired. In accordance with the previously taught expanded keypad feature, the covered portion of the keypad 54 provides paging functions when the second housing portion 14 is moved to its closed housing position 18 and radiotelephone functions when the second housing portion 14 is moved to its open housing position 20.

Yet, still another unique feature of the wireless communication device 10 as shown in FIGS. 1 and 2 is an antenna 56 coupled to the first housing portion 12. A transceiver (FIG. 7) is substantially disposed in the third housing portion 16. The antenna 56 is coupled to the transceiver and the first housing portion 12. The antenna 56 is moveable between a first, closed, antenna position designated by reference numeral 60 at pocket 58 and a second, open, antenna position designated by reference numeral 62 extended beyond the first housing portion 12. The antenna 56 is shown to be rotatably coupled to the first housing portion 12 between antenna positions 60 and 62. The antenna preferably extends beyond the housing portion having the earpiece transducer 26 such that the antenna extends above a human head.

For the radiotelephone 10 having the length of the first housing portion 12 approximately equal to the length of the third housing portion 16, a conventional antenna extending beyond the third housing portion 16 would not reach beyond the length of the first housing portion 12. In this position a shadowing phenomenon reduces the performance of the antenna 56. However, extending the conventional antenna beyond the first, moveable housing portion 12 raises the antenna 56 to an even further extended position away from the radiotelephone 10 and therefore overcomes the shadowing problem resulting in improved antenna performance.

Figure 4:
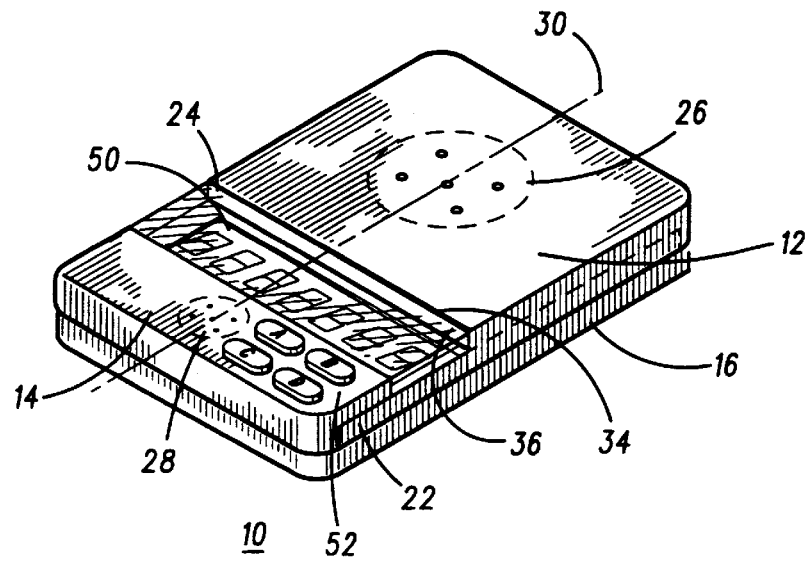
FIG. 4 is a perspective view of the radiotelephone of FIG. 3 in a closed position.
Figure 3:
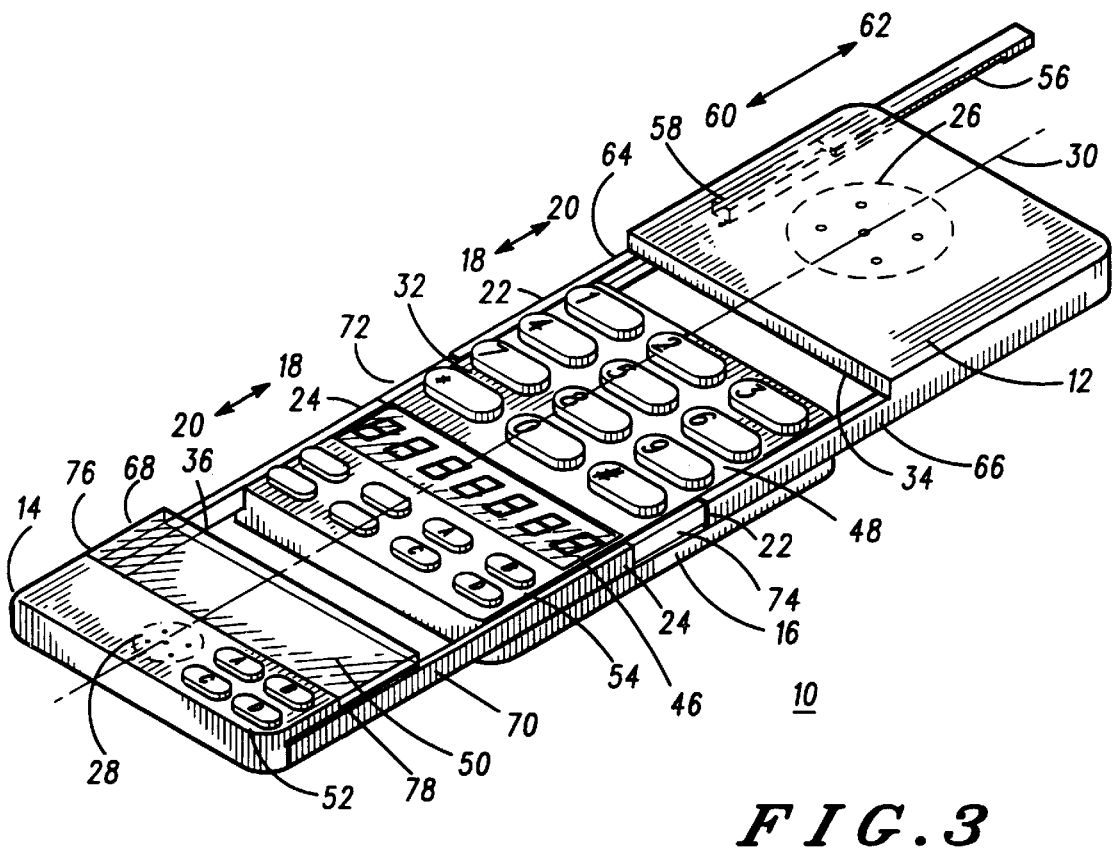
FIG. 3 is a perspective view of a radiotelephone in an open position constructed in accordance with a second preferred embodiment of the present invention.

Referring now to FIGS. 3 and 4, there are shown perspective views of the radiotelephone 10 in an open and closed position, respectively, constructed in accordance with a second preferred embodiment of the present invention. The radiotelephone is the same as the radiotelephone 10 shown in FIGS. 1 and 2 and described in the associated text with the following two exceptions. Firstly, the first 12 and second 14 housing portions are slidably coupled to the third housing portion 16 rather than being rotatably coupled. Secondly, the antenna 56 is slidably coupled to the first housing portion 12 rather than being rotatably coupled.

The radiotelephone 10 comprises a housing assembly having first 12, second 14, and third 16 housing portions. The first 12 and second 14 housing portions are each coupled to the third 16 housing portion. The third housing portion includes a side 32. The first 12 and second 14 housing portions are each moveable between a first, closed position, designated by reference numeral 18 in FIG. 3 as shown in FIG. 4, and a second, open position, designated by reference numeral 20 in FIG. 3 as shown in FIG. 3. The first housing portion 12 is moveable between a first housing position 18 at least partially covering a side 32 of the third housing portion 16 and a second housing position 20 at least partially exposing the side 32 of the third housing portion 16. The second housing portion 14 is moveable between a first housing position 18 at least partially covering the side 32 of the third housing portion 16 and a second housing position 20 at least partially exposing the side 32 of the third housing portion 16.

A unique feature of the radiotelephone 10 is readily apparent from viewing both FIGS. 3 and 4. The first housing portion 12 has an end portion 22. The second housing portion 14 has an end portion 24 extending beyond the end portion 22 of the first housing portion 12 when the first 12 and the second 14 housing portions are moved to their first respective housing positions 18 at least partially covering the side 32 of the third housing portion 16. Preferably, the length of the first 12 housing portion and the length of the second 14 housing portion are each greater than one-half the length of the third housing portion 16.

Opposing sides 64 and 66 of the first housing portion 12 each slide and are thereby captured by opposing guide rails 72 and 74 on the side 32 of the third housing portion 16. Similarly, opposing sides 68 and 70 of the second housing portion 14 each slide and are thereby captured by opposing guide rails 72 and 74 on the side 32 of the third housing portion 16. The first and second housing portions 12 and 14 are raised above the side 32 of the third housing portion 16 to permit the first 12 and the second 14 housing portions to at least partially cover the side 32 when the housing portions 12 and 14 are in their closed housing position 18.

When the housing portions 12 and 14 are in their closed housing position 18, the side 64 of the first housing portion 12 slides past and over the side 68 of the second housing portion 14. Likewise, the side 66 of the first housing portion 12 slides past and over the side 70 of the second housing portion 14. The end portion 22 at the opposing sides 64 and 66 of the first housing portion 12 are disposed in grooves 76 and 78, respectively, when the housing portions 12 and 14 are in their respective closed positions.

When the housing portions 12 and 14 are in their open housing position 20, conventional stops (not shown) at the end portion 22 of the first housing position 12 and the end portion 24 of the second housing portion 14 keep the housing portions 12 and 14 from separating from the third housing portion 16. The conventional stops also retain the housing portions 12 and 14 when the housing portions 12 and 14 are in their closed housing position 18.

The first and second housing portions 12 and 14 are shown to be slidably coupled to opposing guide rails 72 and 74 on the third housing portion 16. Alternatively, only one side of the first and second housing portions 12 and 14 need be slidably coupled to the third housing portion 16, given a robust design. For example, the side 64 of the first housing portion 12 slidably engages with guide rail 72 of the third housing portion 16 and the side 70 of the second housing portion 14 slidably engages with guide rail 74 of the third housing portion 16. Thus, absolutely, no overlap occurs between any part of the sides of the first and second housing portions 12 and 14.

A conventional earpiece transducer 26 is coupled to the first housing portion 12 and a conventional microphone transducer 28 is coupled to the second housing portion 14. The earpiece 26 and microphone 28 transducers are substantially aligned with a center axis 30 of the third housing portion 16. Conventional transceiving means (see FIG. 7), coupled to the earpiece 26 and microphone 28 transducers, is preferably disposed in the third housing portion 16.

In the closed housing position 18, the major surfaces of first 12 and second 14 housing portions are substantially disposed in the same plane, and preferably, adjacent to the side 32 of the third housing portion 16. Preferably, a side 34 of the first housing portion 12 is shaped to matively engage with a side 36 of the second housing portion 14. Such engagement permits the positioning of the first 12 and second 14 housing portions in the same plane adjacent to the side 32 of the third housing portion 16 while permitting the earpiece 26 and microphone 28 transducers to align with the center axis 30.

Note that in the closed position 18, the holes in the earpiece 26 and microphone 28 transducers are facing away from the side 32 of the third housing portion 16. This produces an opportunity for the user to use the earpiece and microphone transducers of the radiotelephone 10 when in its closed position 18. One such use includes a hands-free operation enabling the user to answer a call without opening the radiotelephone 10.

In the open housing position 20, the first housing portion 22 is disposed at an obtuse angle relative to the third housing portion 16, preferably 180°, permitting alignment of the earpiece transducer 26 with a human ear. Similarly, the second housing portion 14 is also disposed at an obtuse angle relative to the third housing portion 16, although preferably 180°, permitting alignment of the microphone transducer 28 with a human mouth. Both the earpiece 26 and microphone 28 transducers remain aligned with the center axis 30 when the first 12 and second 14 housing portions are in the open housing position 20.

Although it would be less desirable than the preferred embodiment, one of the first 12 and second 14 housing portions may overlap the other such that the first 12 and second 14 housing portions are disposed in different but preferably substantially parallel planes.

The movement of the first housing portion 12 between the closed 18 and open 20 housing positions can be coupled to the movement of the second housing portion 14 between the closed 18 and open 20 housing positions. Contrary to the rotating housing portions 12 and 14 of FIGS. 1 and 2, the sliding housing portions 12 and 14 of FIGS. 3 and 4 do not interfere with each other and thus can be moved at the same time. Of course, elaborate coupling mechanisms may be employed to automatically open each of the first 12 and the second 14 housing portions.

The radiotelephone 10 is advantageous in that is contracted to approximately one third of its useable length when in its closed position 18 while providing only one additional layer of housing material. This results in a reduction in thickness of the device and a weight reduction approximately equal to that of one moveable housing portion. Furthermore, when the radiotelephone 10 is expanded to its open position 20, the earpiece 26 and microphone 28 transducers remain on the center axis 30 of the third housing portion 16 permitting convenient and comfortable alignment with a human ear and mouth.

The radiotelephone 10 further includes a display 46 and a data input device, such as a keypad 48, preferably coupled to the side 32 of the third housing portion 16. As the radiotelephone 10 becomes smaller, less space is available for the display 46 and keypad 48. However, radiotelephones are being designed with more capability to provide a greater range of services and thus need additional display 46 and keypad 48 resources to support the expanded capability. One such example of added capability is the addition of a selective call receiver functions, such as a conventional pager, to the functionality of the radiotelephone 10. Such expanded capability problems are overcome by relating paging and radiotelephone modes associated with the wireless communication device 10 to at least one of the first 12 and second 14 housing portions being moved between the closed 18 and open 20 positions.

The display functionality is expanded by displaying paging information when the first housing portion 12 is moved to the closed position 18 and radiotelephone information when the first housing portion 12 is moved to the open housing position 20.

The keypad functionality is expanded by having paging functions associated therewith when the first housing portion 12 is in the closed position 18 and radiotelephone functions associated therewith when the first housing portion 12 is moved to the open housing position 20.

As with FIGS. 1 and 2, the dual modes of the device 10 are not limited to only radiotelephone and paging functions. This feature of the present invention is intended to include any two modes of the wireless communication device. For example, the dual modes alternatively include: radiotelephone vs. notebook functions, private vs. hands-free conversation and cellular vs. cordless functions.

The display 46 and keypad 48 are preferably covered by the moveable housing portions as shown in FIGS. 3 and 4, but do not necessarily need to be covered to gain the expanded functionality provided by the moveable housing portion as discussed with FIGS. 1 and 2.

Another unique feature of the wireless communication device 10 as shown in FIGS. 3 and 4 is a substantially transparent portion 50, hereinafter called a lens, coupled to the second housing portion 14. As similarly discussed with FIGS. 1 and 2, the lens 50 is coupled to the second 14 housing portion such that the lens is disposed essentially opposite at least a portion of the display 46 when the second 14 housing portion is moved to the closed housing position 18. Thus, the display capability is expanded since it can now be used when the second housing portion is in its closed position 18. Of course, the lens may optionally be coupled to both of the moveable housing portions 12 and 14 if so desired. In accordance with the previously taught expanded keypad feature, the covered display 46 provides paging information when the housing portions are moved to their closed housing position 18 and radiotelephone information when the housing portions are moved to their open 20 housing position.

Still another unique feature of the wireless communication device 10 as shown in FIGS. 3 and 4 is keycap means 52 coupled to the second housing portion 14. As discussed with FIGS. 1 and 2, the keycaps 52 are coupled to the second housing portion 14 such that the keycaps 52 are disposed essentially opposite at least a portion of the keypad 54 when the second housing portion 14 is moved to the closed housing position 18. The keycaps 52 are comprised of conventional elastomeric material and protrude through the thickness of the second housing portion 14. The keycaps 52 are coupled to the second housing portion 14 by sandwiching webbing interconnecting individual keycaps between layers of the second housing portion 14. Thus, the keypad capability is expanded since it can now be used when the second housing portion 14 is in its closed position 18. Of course, additional keycaps may also be coupled to the first housing portion 12 if so desired. In accordance with the previously taught expanded keypad feature, the covered portion of the keypad 54 provides paging functions when the second housing portion 14 is moved to its closed housing position 18 and radiotelephone functions when the second housing portion 14 is moved to its open 20 housing position.

Yet, still another unique feature of the wireless communication device 10 as shown in FIGS. 3 and 4 is an antenna 56 coupled to the first housing portion 12. A transceiver (FIG. 7) is substantially disposed in the third housing portion 16. The antenna 56 is coupled to the transceiver and the first housing portion 12. The antenna 56 is moveable between a first, closed, antenna position designated by reference numeral 60 at pocket 58 and a second, open, antenna position designated by reference numeral 62 extended beyond the first housing portion 12. The antenna 56 is shown to be slidably coupled to the first housing portion 12 between antenna positions 60 and 62. The antenna preferably extends beyond the housing portion having the earpiece transducer 26 such that the antenna extends above a human head.

For the radiotelephone 10 having the length of the first housing portion 12 approximately equal to the length of the third housing portion 16, a conventional antenna extending beyond the third housing portion 16 would not reach beyond the length of the first housing portion 12. In this position the shadowing phenomenon reduces the performance of the conventional antenna. However, extending the antenna 56 beyond the first, moveable housing portion 12 raises the antenna 56 to an even further extended position away from the radiotelephone 10 and therefore overcomes the shadowing problem resulting in improved antenna performance.

Figure 6:
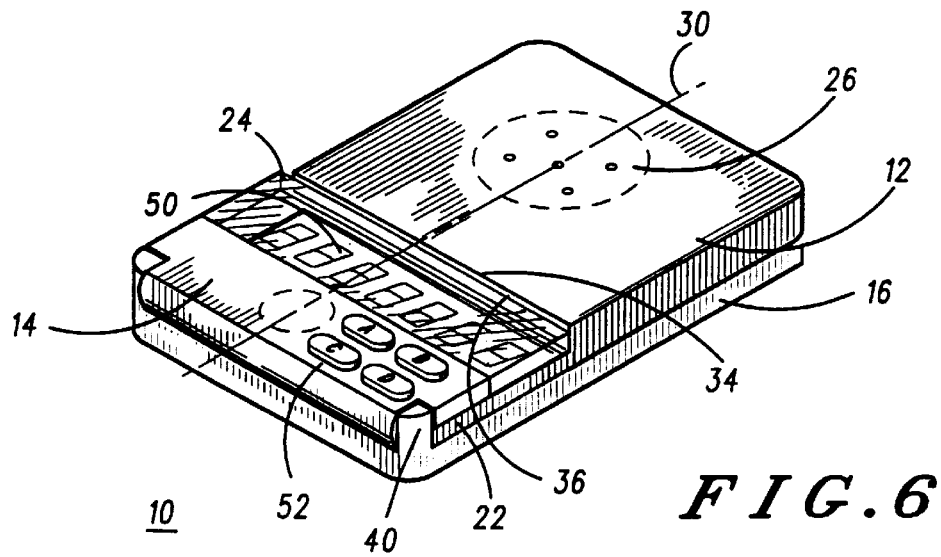
FIG. 6 is a perspective view of the radiotelephone of FIG. 5 in a closed position.
Figure 5:
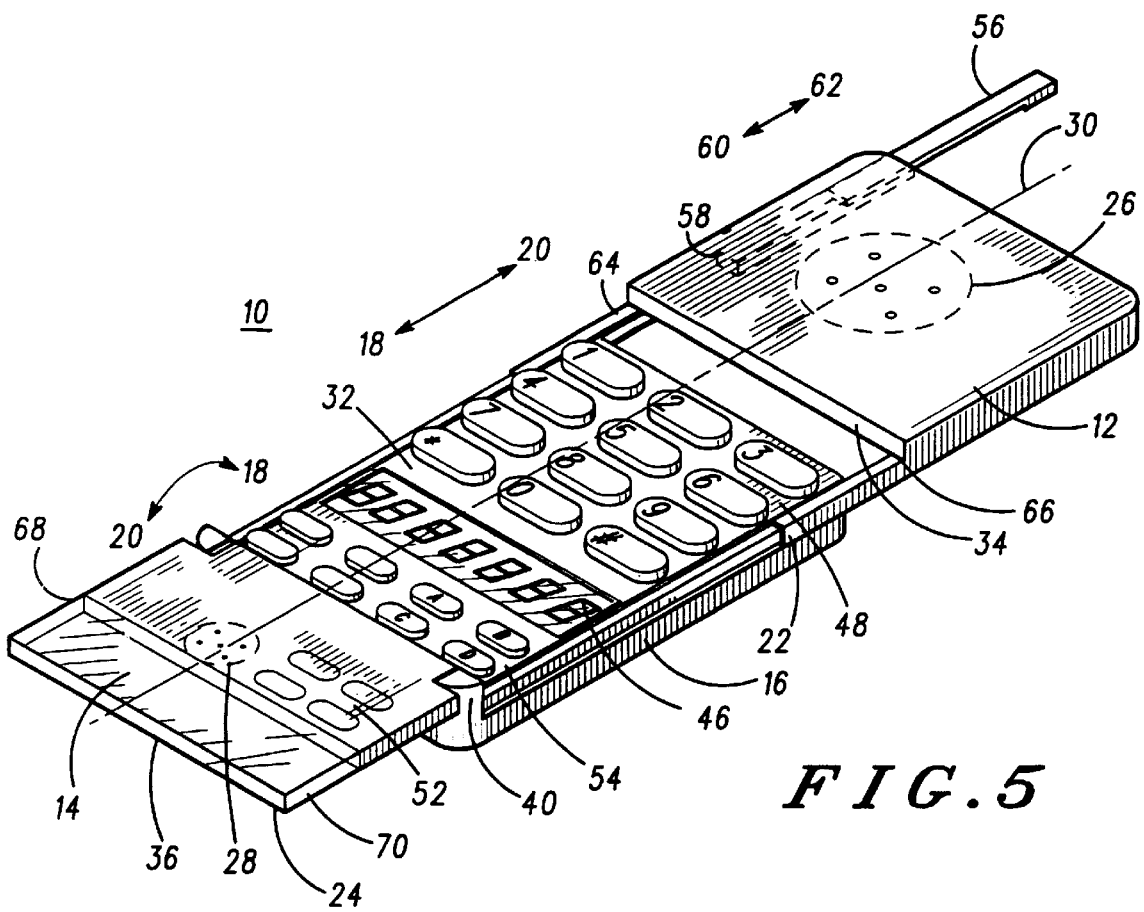
FIG. 5 is a perspective view of a radiotelephone in an open position constructed in accordance with a third preferred embodiment of the present invention.

Referring now to FIGS. 5 and 6, there are shown perspective views of the radiotelephone 10 in an open and closed position, respectively, constructed in accordance with a third preferred embodiment of the present invention. The radiotelephone is the same as the radiotelephone 10 shown in FIGS. 3 and 4 and described in the associated text with the following one exception. The second housing portion 14 is rotatably coupled to the third housing portion 16 rather than being slidably coupled. Therefore, a combination of sliding and rotating moveable housing portions is shown.

The radiotelephone 10 has a housing assembly having first 12, second 14, and third 16 housing portions. The first 12 and second 14 housing portions are each coupled to the third 16 housing portion. The third housing portion includes a side 32. The first 12 and second 14 housing portions are each moveable between a first, closed position, designated by reference numeral 18 in FIG. 5 as shown in FIG. 6, and a second, open position, designated by reference numeral 20 in FIG. 5 as shown in FIG. 5. The first housing portion 12 is moveable between a first housing position 18 at least partially covering the side 32 of the third housing portion 16 and a second housing position 20 at least partially exposing the side 32 of the third housing portion 16. The second housing portion 14 is moveable between a first housing position 18 at least partially covering the side 32 of the third housing portion 16 and a second housing position 20 at least partially exposing the side 32 of the third housing portion 16.

A unique feature of the radiotelephone 10 is readily apparent from viewing both FIGS. 5 and 6. The first housing portion 12 has an end portion 22. The second housing portion 14 has an end portion 24 extending beyond the end portion 22 of the first housing portion 12 when the first 12 and the second 14 housing portions are moved to their first respective housing positions 18 and at least partially covering the side 32 of the third housing portion 16. Preferably, the length of the first 12 housing portion and the length of the second 14 housing portion are each greater than one-half the length of the third housing portion 16.

Opposing sides 64 and 66 of the first housing portion 12 each slide and are thereby captured by opposing guide rails 72 and 74 on the side 32 of the third housing portion 16. The first and second housing portions 12 and 14 are raised above the side 32 of the third housing portion 16 to permit the first 12 housing portion to at least partially cover the side 32 when the first housing portions 12 is in its closed housing position 18.

The second housing portion 14 is rotatably coupled to the third housing portion 16 between the closed 18 and open 20 housing positions via hinge mechanism 40. The second housing portion 14 is manually rotated between the open 18 and closed 20 position. The hinge mechanism 40 also retains second housing portion 14 the closed 18 and open 20 housing positions. Conventional hinge mechanisms are acceptable for use with the present invention.

When the housing portions 12 and 14 are in their closed housing position 18, the side 64 of the first housing portion 12 slides under the side 268 of the second housing portion 14. Likewise, the side 66 of the first housing portion 12 slides under the side 70 of the second housing portion 14.

When the first housing portion 12 is in its open housing position 20, conventional stops (not shown) at the end portion 22 of the first housing position 12 keep the first housing portion 12 from separating from the third housing portion 16. The conventional stops also retain the first housing portion 12 when the first housing portion 12 is in its closed housing position 18.

The first housing portion 12 is shown to be slidably coupled to opposing guide rails 72 and 74 on the third housing portion 16. Alternatively, only one side of the first housing portion 12 need be slidably coupled to the third housing portion 16 given a robust design. For example, the side 64 of the first housing portion 12 slidably engages with guide rail 72 of the third housing portion 16 only.

A conventional earpiece transducer 26 is coupled to the first housing portion 12 and a conventional microphone transducer 28 is coupled to the second housing portion 14. The earpiece 26 and microphone 28 transducers are substantially aligned with a center axis 30 of the third housing portion 16. Conventional transceiving means (see FIG. 7), coupled to the earpiece 26 and microphone 28 transducers, is preferably disposed in the third housing portion 16.

In the closed housing position 18, the major surfaces of first 12 and second 14 housing portions are substantially disposed in the same plane, and preferably, adjacent to the side 32 of the third housing portion 16. Preferably, a side 34 of the first housing portion 12 is shaped to matively engage with a side 36 of the second housing portion 14. Such engagement permits the positioning of the first 12 and second 14 housing portions in the same plane adjacent to the side 32 of the third housing portion 16 while permitting the earpiece 26 and microphone 28 transducers to align with the center axis 30.

Note that in the closed position 18, the holes in the earpiece transducer 26 is facing away from the side 32 of the third housing portion 16 and microphone transducer 28 is facing towards the side 32 of the third housing portion 16.

In the open housing position 20, the first housing portion 22 is disposed at an obtuse angle relative to the third housing portion 16, preferably 180°, permitting alignment of the earpiece transducer 26 with a human ear. Similarly, the second housing portion 14 is also disposed at an obtuse angle relative to the third housing portion 16, although preferably 135°, permitting alignment of the microphone transducer 28 with a human mouth. Both the earpiece 26 and microphone 28 transducers remain aligned with the center axis 30 when the first 12 and second 14 housing portions are in the open housing position 20.

Although it would be less desirable than the preferred embodiment, one of the first 12 and second 14 housing portions may overlap the other such that the first 12 and second 14 housing portions are disposed in different but preferably substantially parallel planes.

The movement of the first housing portion 12 between the closed 18 and open 20 housing positions can be coupled to the movement of the second housing portion 14 between the closed 18 and open 20 housing positions. Contrary to the rotating housing portions 12 and 14 of FIGS. 1 and 2, the movement of the housing portions 12 and 14 of FIGS. 5 and 6 do not interfere with each other and thus can be moved at the same time. Of course, elaborate coupling mechanisms may be employed to automatically open each of the first 12 and the second 14 housing portions.

The radiotelephone 10 is advantageous in that is contracted to approximately one third of its useable length when in its closed position 18 while providing only one additional layer of housing material. This results in a reduction in thickness of the device and a weight reduction approximately equal to that of one moveable housing portion. Furthermore, when the radiotelephone 10 is expanded to its open position 20, the earpiece 26 and microphone 28 transducers remain on the center axis 30 of the third housing portion 16 permitting convenient and comfortable alignment with a human ear and mouth.

The radiotelephone 10 further includes a display 46 and a data input device, such as a keypad 48, preferably coupled to the side 32 of the third housing portion 16. As the radiotelephone 10 becomes smaller, less space is available for the display 46 and keypad 48. However, radiotelephones are being designed with more capability to provide a greater range of services and thus need additional display 46 and keypad 48 resources to support the expanded capability. One such example of added capability is the addition of a selective call receiver functions, such as a conventional pager, to the functionality of the radiotelephone 10. Such expanded capability problems are overcome by relating paging and radiotelephone modes associated with the wireless communication device 10 to at least one of the first 12 and second 14 housing portions being moved between the closed 18 and open 20 positions.

The display functionality is expanded by displaying paging information when the second housing portion 14 is moved to the closed position 18 and radiotelephone information when the second housing portion 14 is moved to the open housing position 20.

The keypad functionality is expanded by having paging functions associated therewith when the second housing portion 14 is in the closed position 18 and radiotelephone functions associated therewith when the second housing portion 14 is moved to the open housing position 20.

As with FIGS. 1 and 2, the dual modes of the device are not limited to only radiotelephone and paging functions. This feature of the present invention is intended to include any two modes of the wireless communication device. For example, the dual modes alternatively include: radiotelephone vs. notebook functions, private vs. hands-free conversation and cellular vs. cordless functions.

The display 46 and keypad 48 are preferably covered by the moveable housing portions as shown in FIGS. 5 and 6, but do not necessarily need to be covered to gain the expanded functionality provided by the moveable housing portion as discussed with FIGS. 1 and 2.

Another unique feature of the wireless communication device 10 as shown in FIGS. 5 and 6 is a substantially transparent portion 50, hereinafter called a lens, coupled to the second housing portion 14. As similarly discussed with FIGS. 1 and 2, the lens 50 is coupled to the second 14 housing portion such that the lens is disposed essentially opposite at least a portion of the display 46 when the second 14 housing portion is moved to the closed housing position 18. Thus, the display capability is expanded since it can now be used when the second housing portion is in its closed position 18. Of course, the lens may optionally be coupled to both of the moveable housing portions 12 and 14 if so desired. In accordance with the previously taught expanded keypad feature, the covered display 46 provides paging information when the housing portions are moved to their closed housing position 28 and radiotelephone information when the housing portions are moved to their open 20 housing position.

Still another unique feature of the wireless communication device 10 as shown in FIGS. 5 and 6 is keycap 52 coupled to the second housing portion 14. As discussed with FIGS. 1 and 2, the keycaps 52 are coupled to the second housing portion 14 such that the keycaps 52 are disposed essentially opposite at least a portion of the keypad 54 when the second housing portion 14 is moved to the closed housing position 18. The keycaps 52 are comprised of conventional elastomeric material and protrude through the thickness of the second housing portion 14. The keycaps 52 are coupled to the second housing portion 14 by sandwiching webbing interconnecting individual keycaps between layers of the second housing portion 14. Thus, the keypad capability is expanded since it can now be used when the second housing portion 14 is in its closed position 18. Of course, additional keycaps may also be coupled to the first housing portion 12 if so desired. In accordance with the previously taught expanded keypad feature, the covered portion of the keypad 54 provides paging functions when the second housing portion 14 is moved to its closed housing position 18 and radiotelephone functions when the second housing portion 14 is moved to its open 20 housing position.

Yet, still another unique feature of the wireless communication device 10 as shown in FIGS. 3 and 4 is an antenna 56 coupled to the first housing portion 12. A transceiver (FIG. 7) is substantially disposed in the third housing portion 16. The antenna 56 is coupled to the transceiver and the first housing portion 12. The antenna 56 is moveable between a first, closed, antenna position designated by reference numeral 60 at pocket 58 and a second, open, antenna position designated by reference numeral 62 extended beyond the first housing portion 12. The antenna 56 is shown to be slidably coupled to the first housing portion 12 between antenna positions 60 and 62. The antenna preferably extends beyond the housing portion having the earpiece transducer 26 such that the antenna extends above a human head.

For the radiotelephone 10 having the length of the first housing portion 12 approximately equal to the length of the third housing portion 16, a conventional antenna extending beyond the third housing portion 16 would not reach beyond the length of the first housing portion 12. In this position the shadowing phenomenon reduces the performance of the antenna 56; however, extending the antenna 56 beyond the first, moveable housing portion 12 raises the antenna 56 to an even further extended position away from the radiotelephone 10 and therefore overcomes the shadowing problem resulting in improved antenna performance.

Referring now to FIG. 7, there is shown a block diagram of the radiotelephone 10 of FIGS. 1–6. The block diagram of the radiotelephone 10 generally includes an antenna 56, a receiver 702, memory 703, a display 46, a keypad 48, a processor 706, an earpiece 26, a microphone 28, a transmitter 709, an alert transducer 710, a switch 711 and a power supply 712. The memory 703 includes conventional read only memory (ROM), random access memory (RAM) and electrically erasable programmable read only memory (EEPROM), and may be external or internal to the processor 706. The radiotelephone 10 is of a cellular portable type such as model number F09HYD8363BG manufactured and available from Motorola Inc. 600 North U.S. Highway 45, Libertyville, Ill. 60048.

Optionally, the radiotelephone 10 is coupled to a selective call receiver unit, or pager 713. The selective call receiver 713 is of the type such as model number A04JRC5661A, manufactured and available from Motorola Inc. 1500 N.W. 22nd Avenue, Boynton Beach, Fla. 33426-8292.

The details in FIG. 7 either represented as a radiotelephone 10 in blocks 701–712 or in combination with a pager 713 and their functional relationship therebetween are well known in the art and will not be described further except to distinguish between what is well known and that described in the preferred embodiments of the present invention.

As discussed with FIGS. 1–6, the radiotelephone 10 performs certain tasks responsive to the position of the moveable housing portions. This is accomplished using the switch 711. When one of the housing portions is in its closed position, the switch is closed circuited and thereby sends a control signal 704 of a logic low to the processor. Likewise, when the one housing portion is in its open position, the switch 711 is open circuited and thereby sends a control signal 704 of a logic high to the processor 706.

The processor 706 is programmed with a predetermined set of instructions which control the functions of the shown blocks of the radiotelephone 10 based on the control signal 704 sent to the processor 706 from the switch 711. Thus, for example, the processor 706 can adaptively reconfigure the keypad 48 and display 46 for either radiotelephone or paging modes depending upon the state of the switch 711.

What is claimed is:

1. A wireless communication device comprising:
   a first housing portion;
   a second housing portion, coupled to the first housing portion and moveable between a first position relative to the first housing portion and a second position relative to the first housing portion;
   a data input device, coupled to the first housing portion and at least partially covered by the second housing portion when the second housing portion is in the first position and at least partially exposed from the second housing portion when the second housing portion is in the second position; and
   a keycap, coupled to the second housing portion, for actuating at least a portion of the data input device when the second housing portion is in the first position, wherein the data input device accesses activation of a first function when the second housing portion is in the first position and accesses activation of a second function when the second housing position is in the second position.

2. A wireless communication device according to claim 1 wherein the first function comprises a paging function and the second function comprises a radiotelephone function.

3. A wireless communication device according to claim 1 wherein the first function comprises a private handset function and the second function comprises a hands-free speakerphone function.

4. A wireless communication device according to claim 1 wherein the first function comprises a notebook function and the second function comprises a radiotelephone function.

5. A wireless communication device comprising:
   a first housing portion;
   a second housing portion; coupled to the first housing portion and moveable to a closed position and an open position;
   an earpiece transducer, coupled to at least one of the first housing portion and the second housing portion;
   a receiver, coupled to the earpiece transducer;
   a microphone transducer, coupled to at least one of the first housing portion and the second housing portion;
   a transmitter, coupled to the microphone transducer;
   a keypad, having at least one key and carried on a side of the first housing portion and at least partially covered by the second housing portion when the second housing portion is in the closed position, for entering data into the wireless communication device;
   a keycap, coupled to the second housing portion, for actuating the at least one key when the second housing portion is in the closed position; and
   a controller, coupled to the keypad, for receiving a first keypress and interpreting it as a first function when the second housing portion is in the closed position and interpreting it as a second function when the second housing portion is in the open position.

6. A radiotelephone comprising:
   a first housing portion;
   a second housing portion, coupled to the first housing portion and moveable relative to the first housing portion between a closed position and an open position;

a data input device having a key, coupled to the first housing portion and at least partially covered by the second housing portion when the second housing portion is in the closed position, for entering data into the radiotelephone responsive to an actuation force applied to the key;

a keycap, coupled to the second housing portion and at least partially covering the key when the second housing portion is in the closed position, for actuating the key when the second housing portion is in the closed position; and a controller, coupled to the data input device, for receiving a first keypress and interpreting it as a first function when the second housing portion is in the closed position and interpreting it as a second function when the second housing portion is in the open position.

7. A radiotelephone according to claim 6 further comprising:

an earpiece transducer, coupled to the first housing portion;

a receiver, coupled to the earpiece transducer;

a microphone transducer, coupled to the second housing portion; and a transmitter, coupled to the microphone transducer.

8. A radiotelephone according to in claim 6 further comprising:

a hinge mechanism, adapted to rotatably connect the first housing portion to the second housing portion, the first housing portion being at a first angle relative to the second housing portion when the second housing portion is in the closed position, and the first housing portion being at a second angle, greater than the first angle, relative to the second housing portion when the second housing portion is in the open position.

9. A radiotelephone according to in claim 6 further comprising:

a slide mechanism, adapted to slidably connect the first housing portion to the second housing portion, the first housing portion being contracted relative to the second housing portion when the second housing portion is in the closed position, and the first housing portion being extended relative to the second housing portion when the second housing portion is in the open position.

10. A wireless communication device comprising:

a first housing portion having a keypad with a key;

a second housing portion, coupled to the first housing portion, moveable between a closed position at least partially covering the keypad and an open position at least partially exposing the keypad;

a keycap, coupled to the second housing portion, for accessing the key when the second housing portion is in the closed position;

a slidable connection, for connecting the first housing portion to the second housing portion and permitting sliding of the first housing portion relative to the second housing portion in a predetermined extension and contraction range; and a controller, coupled to the keypad for receiving a first keypress and interpreting it as a first function when the second housing portion is in the closed position and interpreting it as a second function when the second housing portion is in the open position.

11. A wireless communication device according to in claim 10, wherein the first housing portion further comprises a groove along which the second housing portion is slidably connected to the first housing portion.

12. A wireless communication device according to in claim 10, wherein the second housing portion further comprises a groove along which the first housing portion is slidably connected to the second housing portion.

13. A wireless communication device comprising:

a housing, having a first housing portion and a second housing portion, movable between a folded position and an unfolded position;

a hinge pivotally joining the first housing portion and the second housing portion;

a first input device, arranged on an inner surface of at least one of the first housing portion and the second housing portion and concealed when the housing is in the folded position, for entering data when the housing is in the unfolded position;

a second input device, arranged on an outer surface of at least one of the first housing portion and the second housing portion, for entering data only when the housing is in the folded position; and a controller, coupled to the first input device, for receiving a first input and interpreting it as a first function when the second housing portion is in the folded position and interpreting it as a second function when the second housing portion is in the unfolded position.

14. A wireless communication device according to claim 13, wherein the first input device comprises a keypad and wherein the second input device comprises a keycap.

* * * * *